United States Patent
Sung et al.

(10) Patent No.: US 10,771,289 B2
(45) Date of Patent: Sep. 8, 2020

(54) MULTI-TRANSMITTER CHANNEL ESTIMATION FOR A TIME VARYING CHANNEL

(71) Applicant: Commonwealth Scientific and Industrial Research Organisation, Acton, Australian Capital Territory (AU)

(72) Inventors: Chang Kyung Sung, Ryde (AU); Rodney Kendall, Cherrybrook (AU); David Eric Humphrey, Carlingford (AU); Hajime Suzuki, Chatswood (AU)

(73) Assignee: Commonwealth Scientific and Industrial Research Organisation, Action, ACT (AU)

( * ) Notice: Subject to any disclaimer, the term of this patent is extended or adjusted under 35 U.S.C. 154(b) by 116 days.

(21) Appl. No.: 16/087,822

(22) PCT Filed: Mar. 24, 2017

(86) PCT No.: PCT/AU2017/050264
§ 371 (c)(1),
(2) Date: Sep. 24, 2018

(87) PCT Pub. No.: WO2017/161424
PCT Pub. Date: Sep. 28, 2017

(65) Prior Publication Data
US 2019/0116065 A1    Apr. 18, 2019

(30) Foreign Application Priority Data

Mar. 24, 2016    (AU) ................................ 2016901120

(51) Int. Cl.
*H04L 12/26* (2006.01)
*H04L 25/02* (2006.01)
(Continued)

(52) U.S. Cl.
CPC ....... *H04L 25/0204* (2013.01); *H04B 17/309* (2015.01); *H04B 17/373* (2015.01); *H04L 25/0232* (2013.01); *H04B 7/0413* (2013.01)

(58) Field of Classification Search
None
See application file for complete search history.

(56) References Cited

U.S. PATENT DOCUMENTS 5,127,051 A    6/1992    Chan et al.
7,310,301 B1 *    12/2007    Kleider ............... H04L 27/2608
370/203

(Continued)

FOREIGN PATENT DOCUMENTS

WO    2005/048497 A2    5/2005

OTHER PUBLICATIONS

International Preliminary Report on Patentability for PCT/AU2017/050264 dated Sep. 25, 2018 (7 pages).
(Continued)

*Primary Examiner* — Zewdu A Beyen
(74) *Attorney, Agent, or Firm* — Merchant & Gould P.C.

(57) ABSTRACT

Disclosed is a method, receiver, multi-receiver device, system and computer readable medium for configuring a receiver to perform multi-transmitter channel estimation for a time-varying channel. In one aspect, the method includes: wirelessly receiving at least two frames, each frame including a block of training symbols received at different points in time for a time-varying channel; estimating, for each block at a block location, a first channel coefficient of the time-varying channel, wherein the block location is the same for each block; and interpolating or extrapolating a plurality of second channel coefficients for the respective training symbols of each block based on the respective first channel coefficient.

14 Claims, 11 Drawing Sheets

(51) Int. Cl.
*H04B 17/309* (2015.01)
*H04B 17/373* (2015.01)
*H04B 7/0413* (2017.01)

(56) References Cited

U.S. PATENT DOCUMENTS

| | | | | |
|---|---|---|---|---|
| 8,064,507 | B1 * | 11/2011 | Cheng | H04B 7/01 375/224 |
| 2006/0291371 | A1 * | 12/2006 | Sutivong | H04B 1/713 370/208 |
| 2015/0295733 | A1 * | 10/2015 | Annavajjala | H04L 25/0206 375/260 |

OTHER PUBLICATIONS

International Search Report for PCT/AU2017/050264 dated Apr. 10, 2017 (4 pages).
Atapattu "Channel Tracking in SDMA-Based Multi-User MIMO-OFDM Communications Systems." Thesis, Queensland University of Technology, Dec. 2013, pp. 1-183.
Coleris et al. "Channel Estimation Techniques Based on Pilot Arrangement in OFDM Systems." IEEE Transactions on Broadcasting, vol. 48, No. 3, Sep. 2002, pp. 223-229.
Leus et al. "Estimation of Time-Varying Channels—a Block Approach." Wireless Communications over Rapidly Time-Varying Channels, 2011, Chapter 4, pp. 155-197.
Ozdemir et al. "Channel Estimation for Wireless OFDM Systems." IEEE Communications Surveys, vol. 9, No. 2, 2007, pp. 18-48.

\* cited by examiner

MULTI-TRANSMITTER CHANNEL ESTIMATION FOR A TIME VARYING CHANNEL

CROSS-REFERENCE TO RELATED APPLICATIONS

The present application claims priority from Australian Provisional Patent Application No. 2016901120 filed on 24 Mar. 2016, the contents of which is incorporated herein by reference.

TECHNICAL FIELD

The present invention relates generally to wireless communication and, in particular to channel estimation for a time varying channel.

BACKGROUND

The application of technology known as multiple-input multiple-output (MIMO) has become prevalent for wireless communication in recent years. MIMO uses multiple transmitters and multiple receivers all operating in the same radio frequency. Modern wireless standards such as Long Term Evolution Advanced (LTE-Advanced) mobile standard and IEEE 802.11ac wireless local area network standard define the use of eight or more transmitters for the purpose of MIMO wireless communication.

Typically, the application of MIMO requires the estimation of radio propagation channels between a single receiver and multiple transmitters. A conventional method to achieve this is to use pre-determined symbols known both to the transmitter and the receiver, herein called channel training symbols.

In IEEE 802.11ac, code orthogonal channel training symbols are used so that the radio propagation channel specific to each transmitter (or transmit stream) can be distinguished and estimated by simple flipping of sign and summation of received symbols. The summation of received symbols allows the reduction of channel estimation error by reducing the effects of random receiver noise. The advantage of the reduction of channel estimation error by this method is herein called the processing gain. However, this operation is effective only if the radio propagation channels during the channel estimation period can be considered stationary. In the case of IEEE 802.11ac, the maximum channel training period corresponds to 4 μsec×8=32 μs, and hence the method is expected to work well as long as the variation of the radio propagation channels within 32 μs is small.

The same method may not be applicable when the symbol time becomes longer and/or the variation of the radio channel within the channel training symbol time becomes larger, such as in the case of LTE-Advanced mobile standard, where one symbol time is 66.7 μs or longer. In LTE-Advanced mobile standard, the assumption of stationary channel over eight or more symbol time may not be valid. Alternatively, LTE-Advanced mobile standard defines the transmission of channel training symbol from only one transmitter within any one time-frequency slot. The radio propagation channel can be estimated without interference from other transmitters in this case. The advantage of this method is to be able to cope with a fast time varying channel. However, disadvantage of this method is the loss of processing gain to reduce the effects of receiver noise at the time of receiving the channel training symbols.

There is therefore a need to estimate the time varying channel for multiple of transmitters while taking advantage of processing gain as well as being able to cope with a fast time varying channel.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

Disclosed are arrangements that estimate time-varying radio propagation channel in the presence of multiple of transmitters operating at the same radio frequency while achieving advantageous effects of processing gain.

In a first aspect there is provided a method of performing multi-transmitter channel estimation for a time-varying channel, wherein the method includes:

(a) wirelessly receiving at least two frames, each frame including a block of training symbols received at different points in time for a time-varying channel;

(b) estimating, for each block at a block location, a first channel coefficient of the time-varying channel, wherein the block location is the same for each block; and (c) interpolating or extrapolating a plurality of second channel coefficients for the respective training symbols of each block based on the respective first channel coefficient.

In certain embodiments of the first aspect, the method further includes:

(d) re-estimating the first channel coefficient for each block based on the plurality of second channel coefficients for each block; and (e) re-estimating the plurality of second channel coefficients for each block by interpolation or extrapolation using the respective first channel coefficient.

In certain embodiments of the first aspect, the method further includes (f) iteratively performing steps (d) and (e) until the respective plurality of second channel coefficients for each block have converged, or until a specified number of iterations is reached.

In certain embodiments of the first aspect, a first channel coefficient for each block is estimated in step (b) as being constant throughout reception of the respective block.

In certain embodiments of the first aspect, the method is performed in a time domain.

In certain embodiments of the first aspect, the method is performed in a frequency domain.

In certain embodiments, the time-varying channel is a narrowband communication channel, wherein the narrowband communication channel has:
  a carrier frequency of 1 GHz or less; and
  a bandwidth of 25 KHz or less.

In certain embodiments, the time-varying channel is a narrowband communication channel, wherein the narrowband communication channel has at least one of:
  a carrier frequency of more than 1 GHz; and
  a bandwidth of more than 25 KHz.

In certain embodiments, the time-varying channel is a wideband communication channel.

In a second aspect there is provided a receiver configured to perform multi-transmitter channel estimation for a time-varying channel, wherein the receiver is configured to:

(a) wirelessly receive at least two frames, each frame including a block of training symbols at different points in time for a time-varying channel;

(b) estimate, for each block at a block location, a first channel coefficient of the time-varying channel, wherein the block location is the same for each block; and (c) interpolate or extrapolate a plurality of second channel coefficients for the respective training symbols of each block based on the respective first channel coefficient.

In certain embodiment of the second aspect, the receiver is further configured to:

(d) re-estimate the first channel coefficient for each block based on the plurality of second channel coefficients for each block; and (e) re-estimate the plurality of second channel coefficients for each block by interpolation or extrapolation using the respective first channel coefficient.

In certain embodiment of the second aspect, the receiver is configured to iteratively re-estimate the first and second channel coefficients for each block until convergence, or until a specified number of iteration is reached.

In certain embodiment of the second aspect, the receiver is configured to estimate, for each block, the first channel coefficient as being constant throughout reception of the respective block.

In certain embodiments of the second aspect, the receiver is configured to perform the multi-transmitter channel estimation in a time domain.

In certain embodiments of the second aspect, the receiver is configured to perform the multi-transmitter channel estimation in a frequency domain.

In certain embodiments, the time-varying channel is a narrowband communication channel, wherein the narrowband communication channel has:
a carrier frequency of 1 GHz or less; and
a bandwidth of 25 KHz or less.

In certain embodiments, the time-varying channel is a narrowband communication channel, wherein the narrowband communication channel has at least one of:
a carrier frequency of more than 1 GHz; and
a bandwidth of more than 25 KHz.

In certain embodiments, the time-varying channel is a wideband communication channel.

In a third aspect there is provided a wireless communication system including:
a plurality of transmitters, each transmitter transmitting in the same frequency; and
a plurality of receivers, wherein each receiver is configured according to the second aspect.

In certain embodiment of the third aspect, each receiver is further configured to:

(d) re-estimate the first channel coefficient for each block based on the plurality of second channel coefficients for each block; and (e) re-estimate the plurality of second channel coefficients for each block by interpolation or extrapolation using the respective first channel coefficient.

In certain embodiment of the third aspect, each receiver is configured to iteratively re-estimate the first and second channel coefficients for each block until convergence, or until a specified number of iteration is reached.

In certain embodiment of the third aspect, each receiver is configured to estimate, for each block, the first channel coefficient as being constant throughout reception of the respective block.

In certain embodiments of the third aspect, each receiver is configured to perform the multi-transmitter channel estimation in a time domain.

In certain embodiments of the third aspect, each receiver is configured to perform the multi-transmitter channel estimation in a frequency domain.

In certain embodiments, the time-varying channel is a narrowband communication channel, wherein the narrowband communication channel has:
a carrier frequency of 1 GHz or less; and
a bandwidth of 25 KHz or less.

In certain embodiments, the time-varying channel is a narrowband communication channel, wherein the narrowband communication channel has at least one of:
a carrier frequency of more than 1 GHz; and
a bandwidth of more than 25 KHz.

In certain embodiments, the time-varying channel is a wideband communication channel.

In a fourth aspect there is provided a computer readable medium including executable instructions which, when executed by a processor of a receiver, configure the receiver to perform multi-transmitter channel estimation for a time-varying channel, wherein the processor is configured to:

(a) wirelessly receive at least two frames, each frame including a block of training symbols at different points in time for a time-varying channel;

(b) estimate, for each block at a block location, a first channel coefficient of the time-varying channel, wherein the block location is the same for each block; and (c) interpolate or extrapolate a plurality of second channel coefficients for the respective training symbols of each block based on the respective first channel coefficient.

In certain embodiments of the fourth aspect, the receiver is further configured to:

(d) re-estimate the first channel coefficient for each block based on the plurality of second channel coefficients for each block; and (e) re-estimate the plurality of second channel coefficients for each block by interpolation or extrapolation using the respective first channel coefficient.

In certain embodiments of the fourth aspect, the receiver is configured to iteratively re-estimate the first and second channel coefficients for each block until convergence, or until a specified number of iterations is reached.

In certain embodiments of the fourth aspect, the receiver is configured to estimate, for each block, the first channel coefficient as being constant throughout reception of the respective block.

In certain embodiments of the fourth aspect, the receiver is configured to perform the multi-transmitter channel estimation in a time domain.

In certain embodiments of the fourth aspect, the receiver is configured to perform the multi-transmitter channel estimation in a frequency domain.

In certain embodiments, the time-varying channel is a narrowband communication channel, wherein the narrowband communication channel has:
a carrier frequency of 1 GHz or less; and
a bandwidth of 25 KHz or less.

In certain embodiments, the time-varying channel is a narrowband communication channel, wherein the narrowband communication channel has at least one of:
a carrier frequency of more than 1 GHz; and
a bandwidth of more than 25 KHz.

In certain embodiments, the time-varying channel is a wideband communication channel.

In a fifth aspect there is provided a multi-receiver device of a wireless communication system for performing multi-transmitter channel estimation for a time-varying channel, wherein the multi-receiver device includes a plurality of receivers, each receiver is configured to perform the method of the first aspect.

In a sixth aspect there is provided a system including:

a multi-transmitter device including a plurality of transmitters, each transmitter transmitting in the same frequency; and a multi-receiver device configured according to the fifth aspect.

Other aspects and embodiments of the invention are also disclosed.

BRIEF DESCRIPTION OF THE PREFERRED EMBODIMENTS

Example embodiments should become apparent from the following description, which is given by way of example only, of at least one preferred but non-limiting embodiment, described in connection with the accompanying figures.

Figure 4:
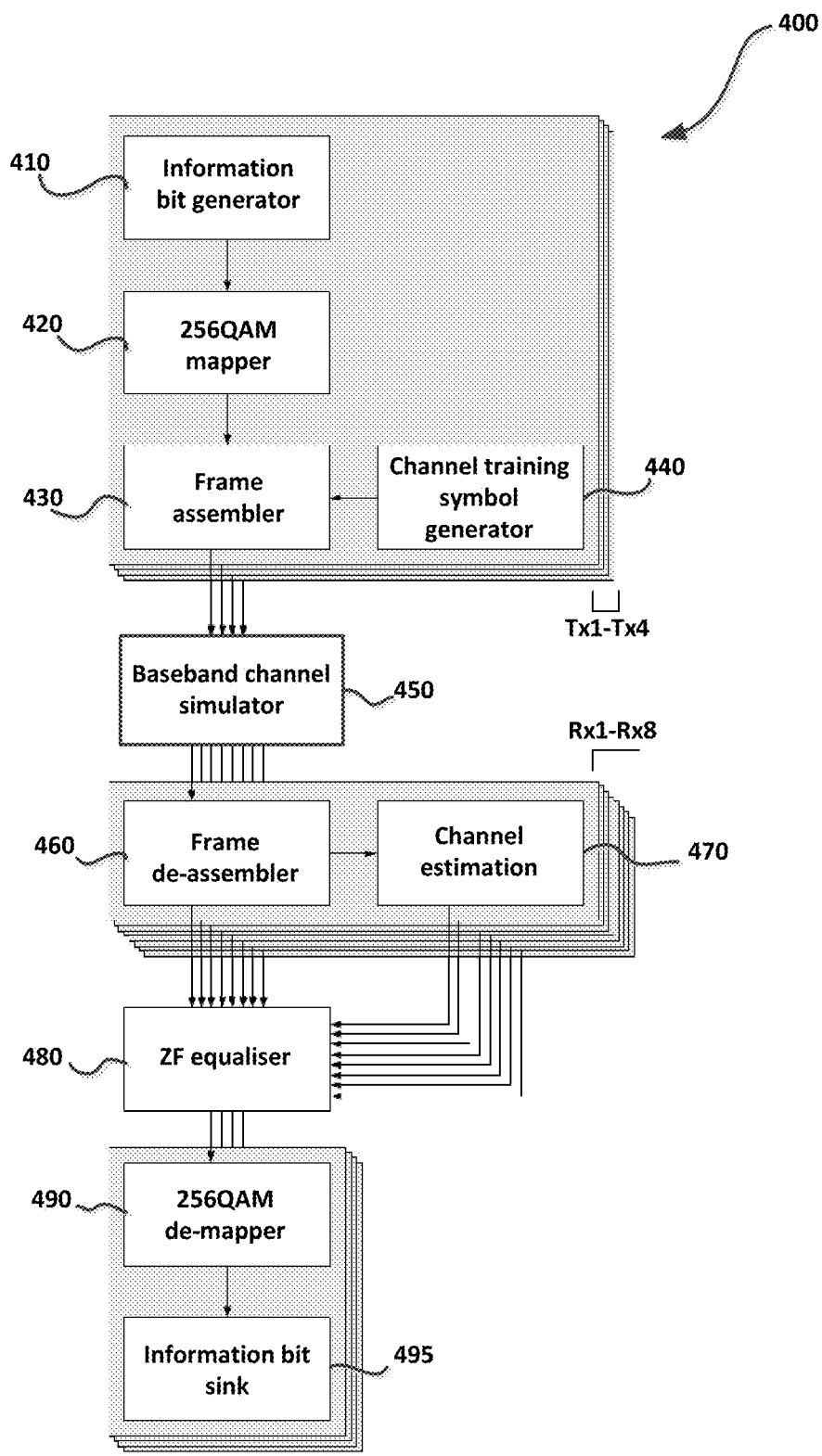
FIG. 4 is an example of a schematic block diagram representation of a simulation performed using TDMA channel estimation, CDMA channel estimation, and the multi-transmitter channel estimation of the current invention.
Figure 7:
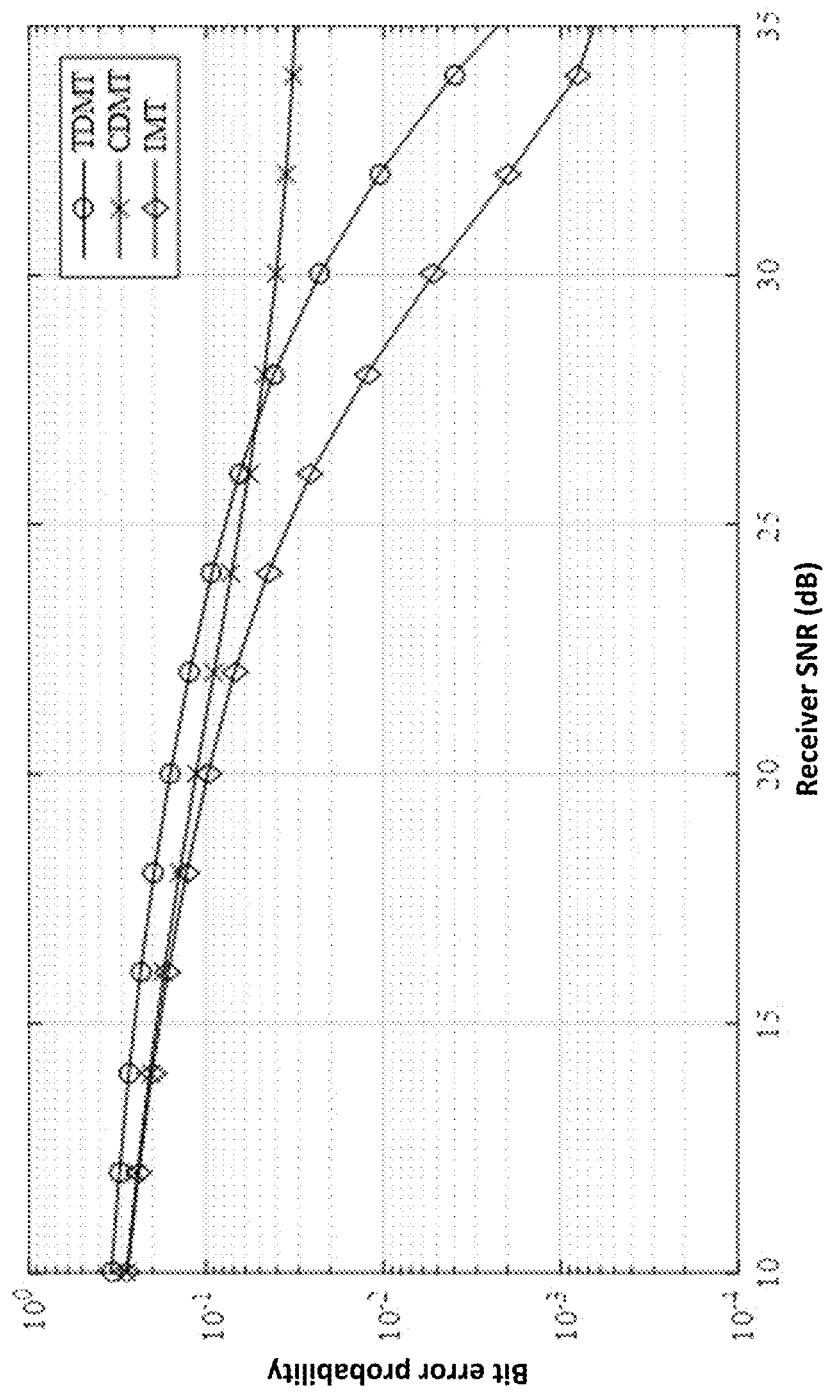
Figure 8A:
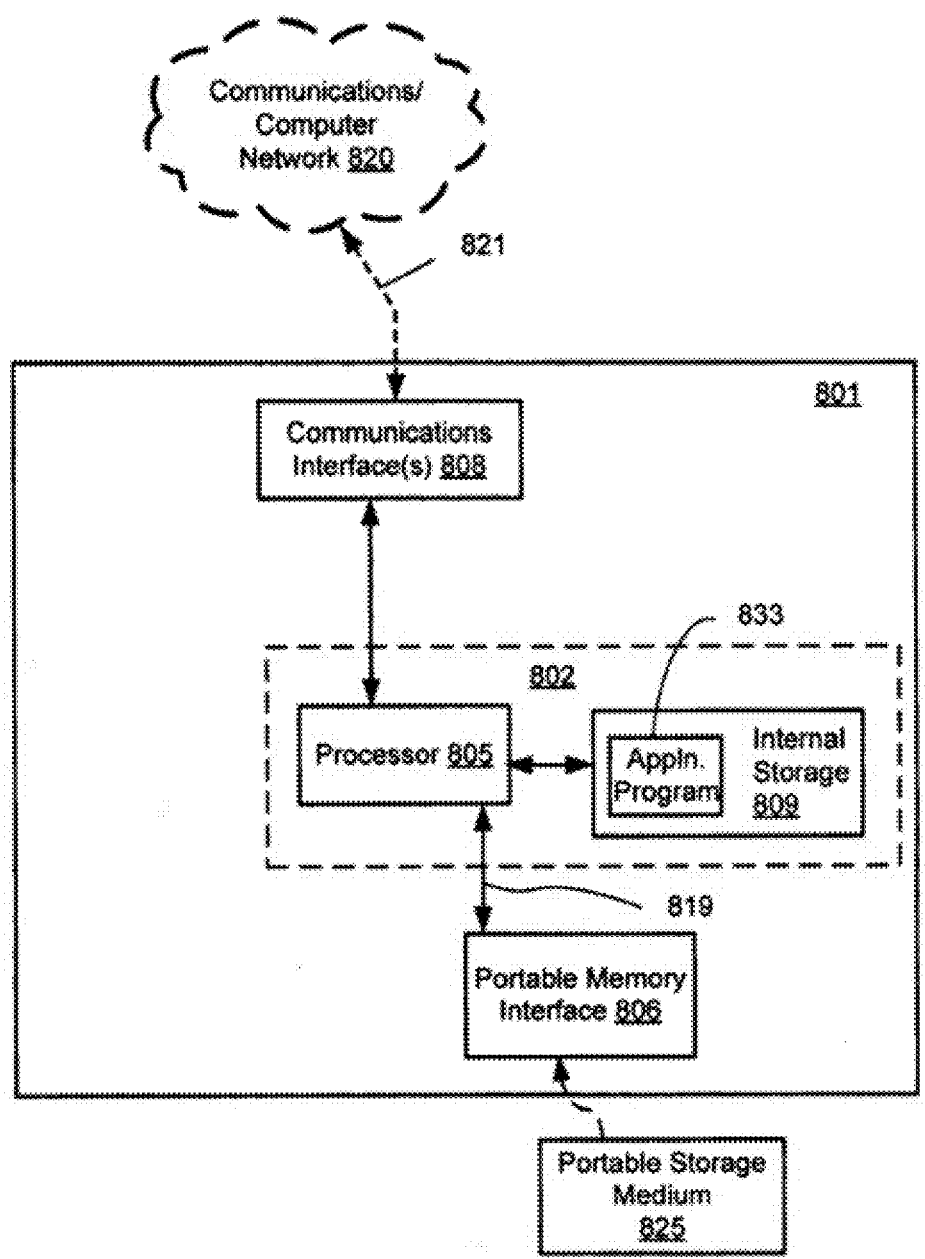
Figure 8B:
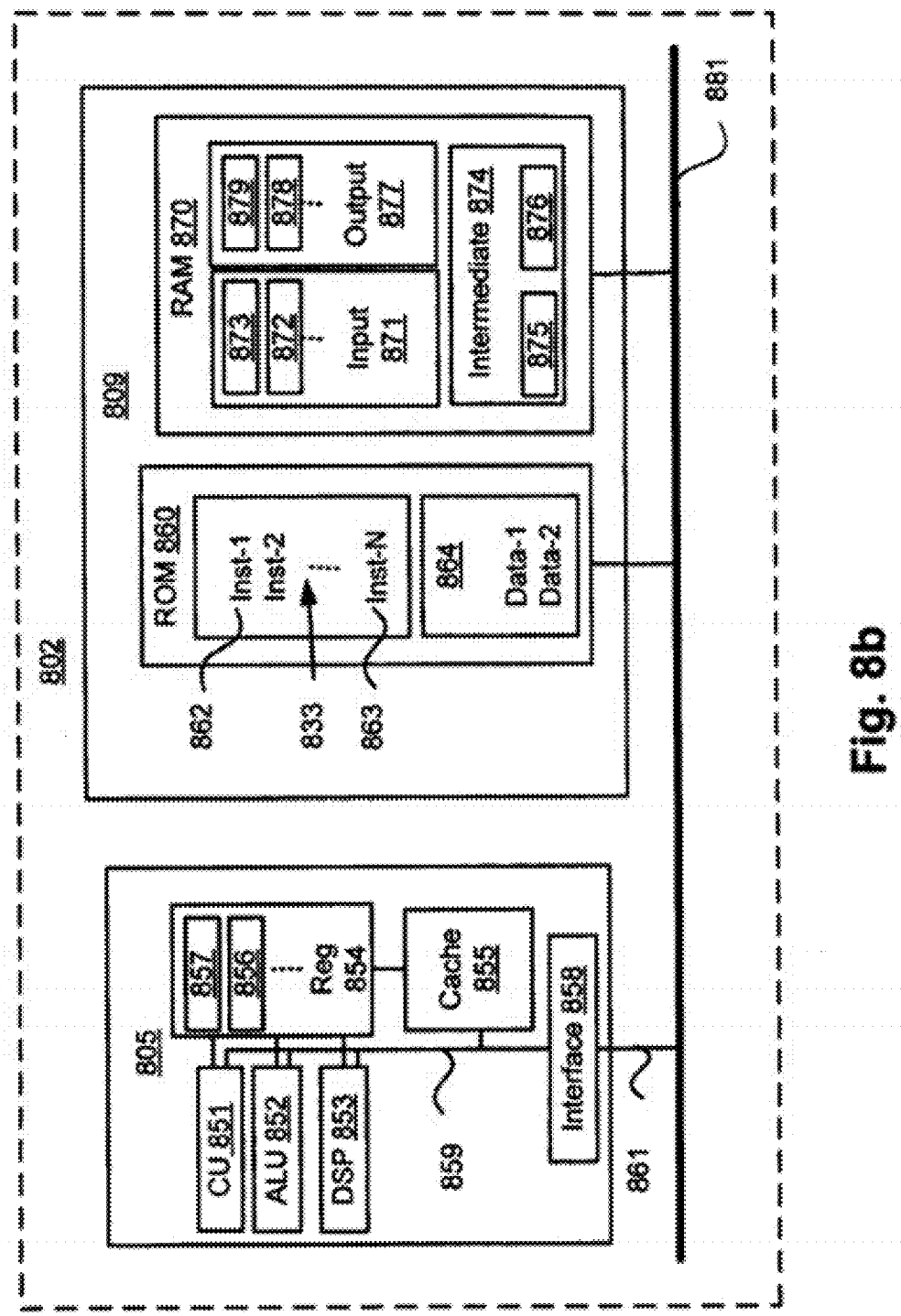
Figure 9:
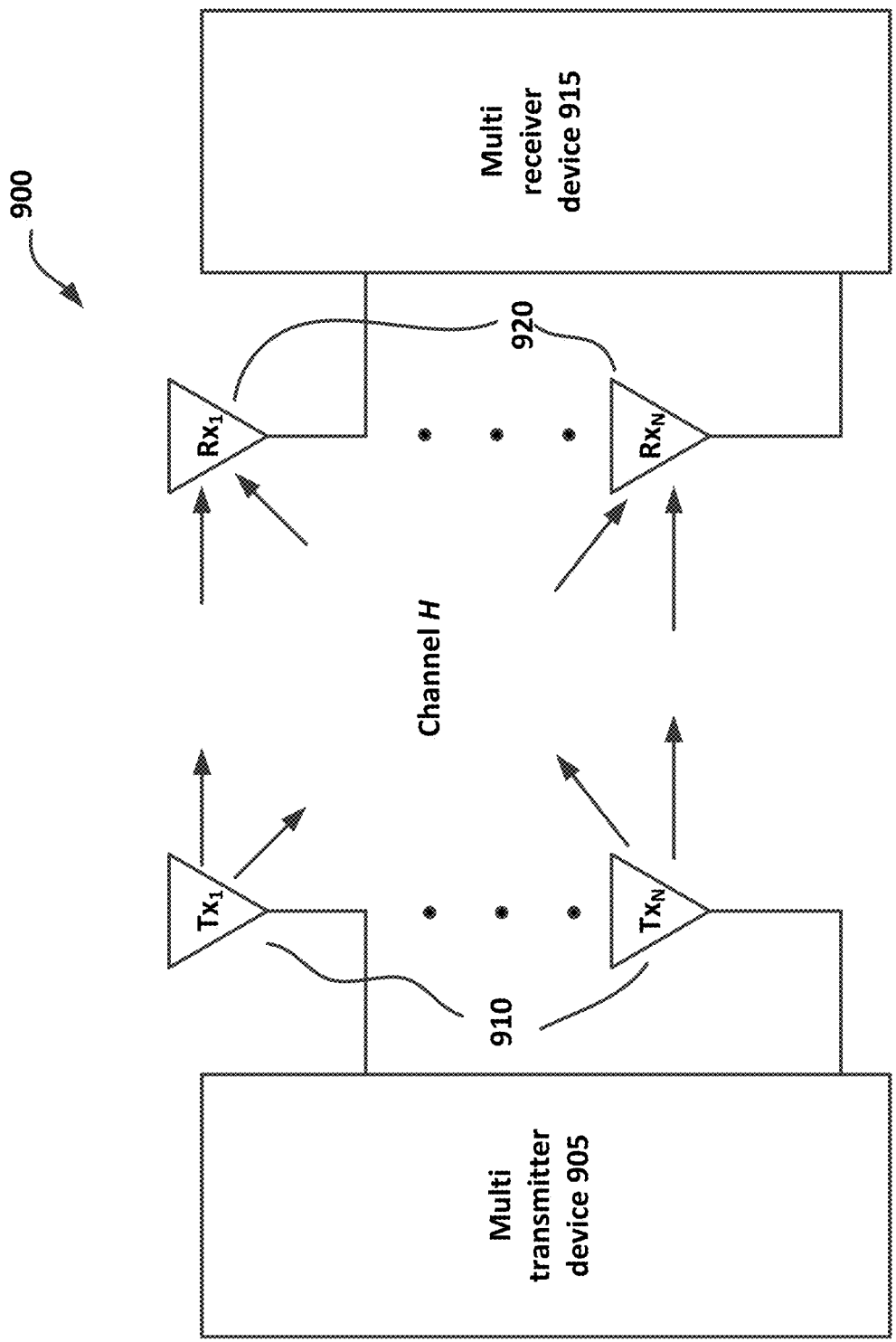

FIG. 7 is a plot of simulation results of bit error probability versus receiver SNR for TDMA channel estimation, CDMA channel estimation, and the multi-transmitter channel estimation of the current invention for the simulation of FIG. 4; and FIGS. 8a and 8b collectively form a schematic block diagram representation of a receiver; and FIG. 9 is a system diagram of a system including a multi-receiver device and a multi-transmitter device.

DETAILED DESCRIPTION

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 1A:
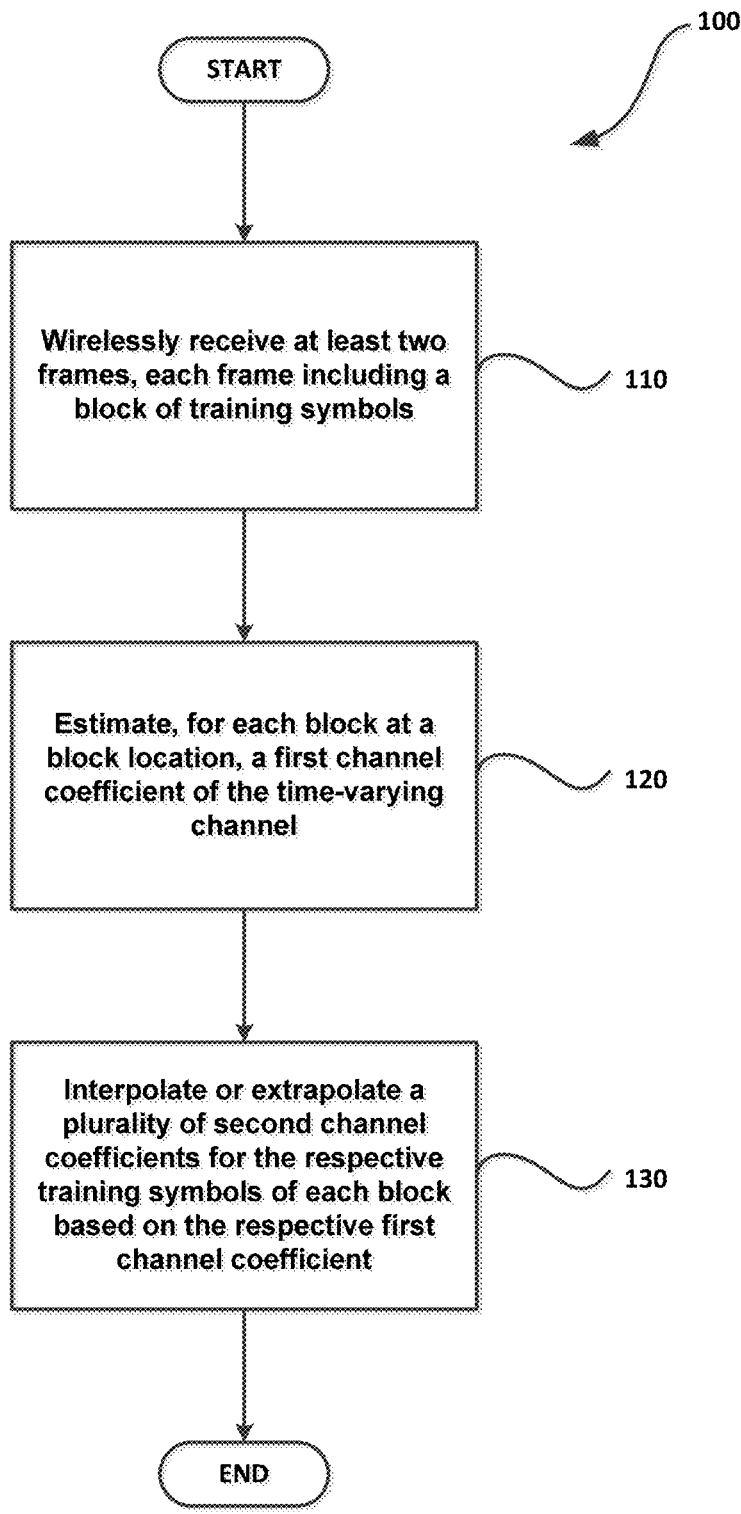
FIG. 1a is a flowchart representing an example method of performing multi-transmitter channel estimation for a time-varying channel.

Referring to FIG. 1a there is shown a flowchart representing an example method 100 of performing multi-transmitter channel estimation for a time-varying channel.

At step 110, the method 100 includes wirelessly receiving at least two frames, each frame including a block of training symbols received at different points in time for a time-varying channel.

At step 120, the method 100 includes estimating, for each block at a block location, a first channel coefficient of the time-varying channel, wherein the block location is the same for each block.

At step 130, the method 100 includes interpolating or extrapolating a plurality of second channel coefficients for the respective training symbols of each block based on the respective first channel coefficient.

Figure 1B:
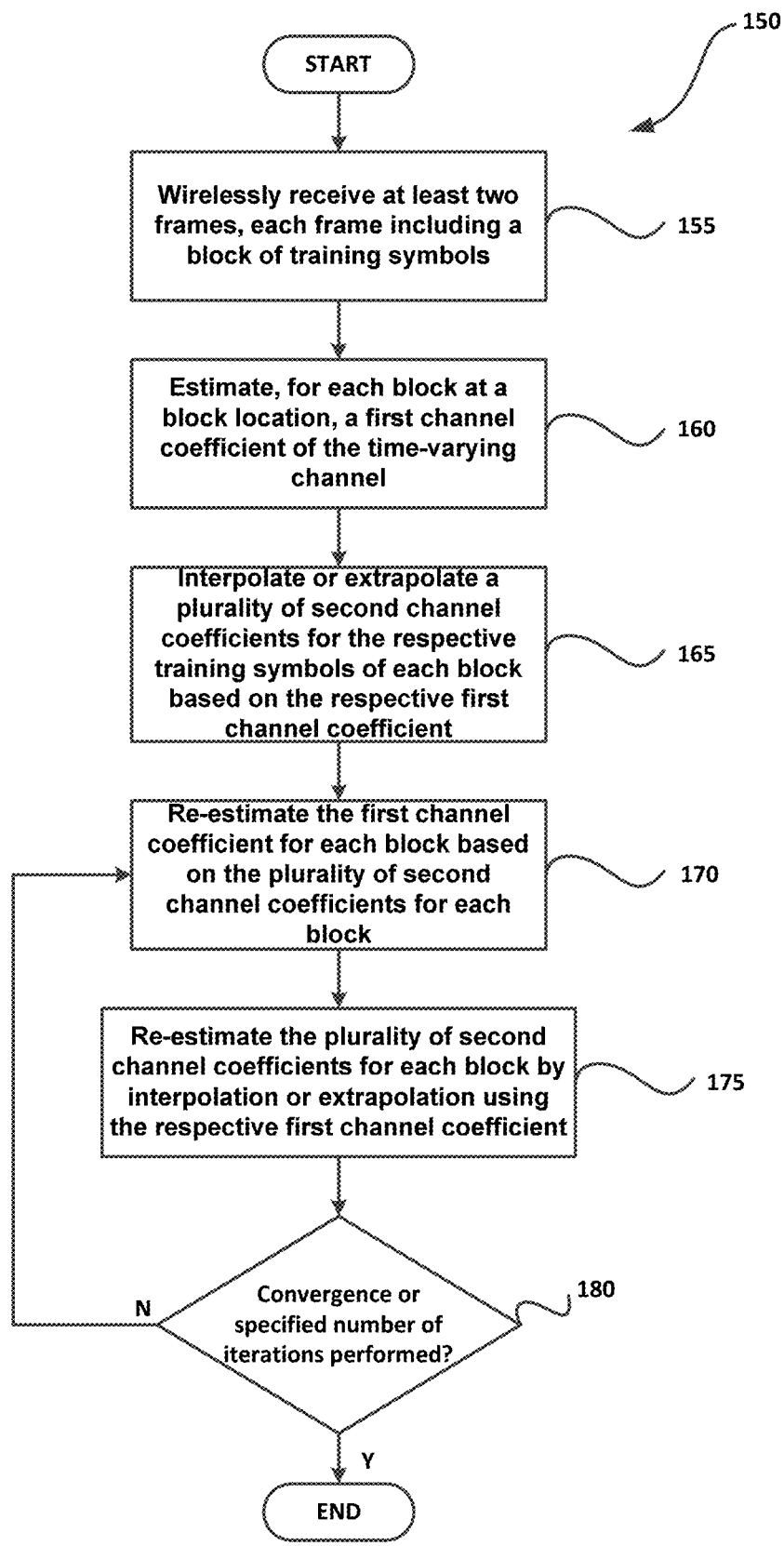
FIG. 1b is a flowchart representing another example method of performing multi-transmitter channel estimation for a time-varying channel.

Referring to FIG. 1b there is shown another example method 150 of performing multi-transmitter channel estimation for a time-varying channel.

In particular, at step 155 the method 150 includes wirelessly receiving at least two frames, each frame including a block of training symbols received at different points in time for a time-varying channel.

At step 160, the method 150 includes estimating, for each block at a block location, a first channel coefficient of the time-varying channel, wherein the block location is the same for each block. Preferably, the first channel coefficient for each block is estimated during step 160 as being constant throughout the reception of the respective block.

At step 165, the method 150 includes interpolating or extrapolating a plurality of second channel coefficients for the respective training symbols of each block based on the respective first channel coefficient.

At step 170, the method includes re-estimating the first channel coefficient for each block based on the plurality of second channel coefficients for each block.

At step 175, the method includes re-estimating the plurality of second channel coefficients for each block by interpolation or extrapolation using the respective first channel coefficient.

At step 180, the method includes determining if the plurality of second channel coefficients for each block have converged or a specified number of iterations have been performed. In the event of a positive determination, channel estimation has been completed. In the event of a negative determination, the method proceeds back to step 170 to perform another iteration of steps 170, 175 and 180 until convergence is achieved, or until a specified number of iterations have been performed.

As will be appreciated from methods 100 and 150, channel estimation for a time-varying channel comprises of at least two stages of channel estimation. The first stage is to estimate a constant component of the channel (i.e. the first channel coefficient) during the reception of at least two blocks of channel training symbols, wherein the at least two blocks are received at two different points in time. The second stage is to utilise the estimated constant component of the channel at the different points in time to estimate the channel coefficients (i.e. the second channel coefficients) for the channel training symbols of each block by interpolation and/or extrapolation. As shown in FIG. 1B, the two stages may be repeated iteratively such that previous calculated channel coefficients can be used for re-estimating the first and second channel coefficients. Utilising interpolation or extrapolation preferably reduces the error caused by inaccuracy in channel estimation by taking advantage of coherence of the channel in the time domain.

Figure 2:
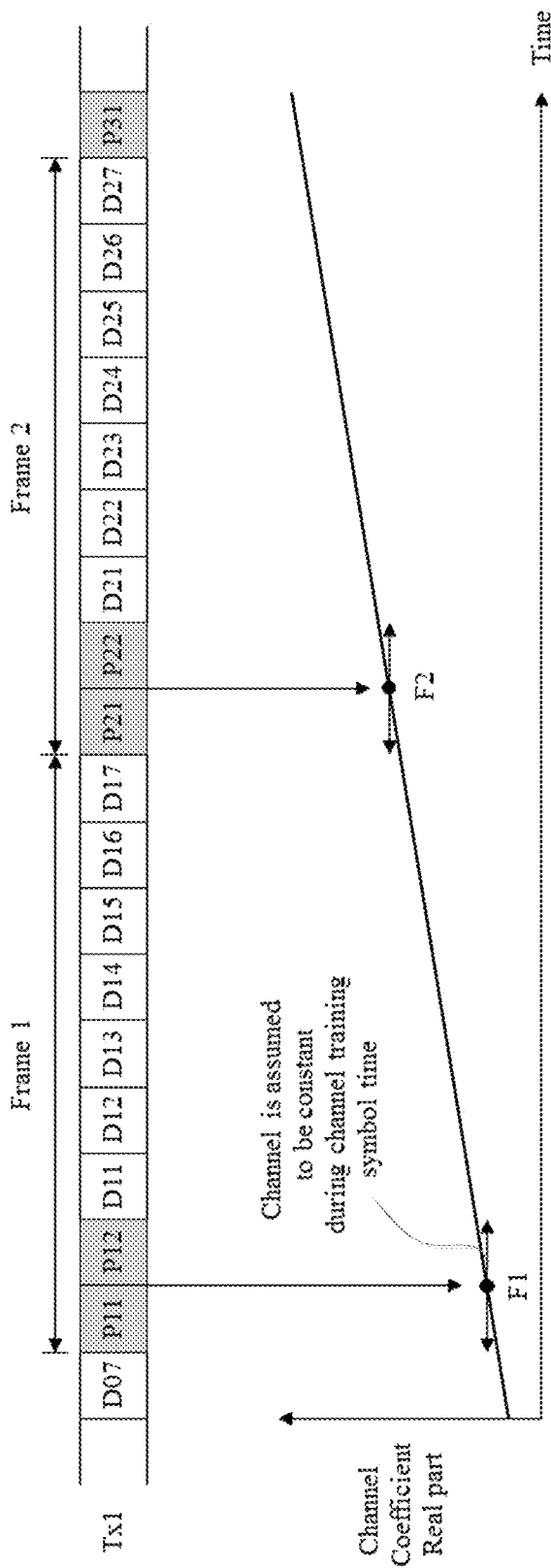
FIG. 2 is a schematic illustrating a first channel estimation stage.

Referring to FIG. 2, there is shown an example structure of a symbol sequence transmitted from the transmitter (Tx1). In this example, the transmitted symbol sequence includes two frames. Each frame includes a channel training symbol part P and a data part D.

During the initial stage of channel estimation, the first channel coefficients at time F1 and F2, and possibly at other frame times, are initially estimated by assuming that the channel is constant during the reception of channel training symbols. For example, initially the channel is assumed to be constant during P11 and P12 for frame 1, and during P21 and P22 for frame 2. As can be seen in FIG. 2, the location within each block which each first channel coefficient is estimated is the same, wherein in this particular instance F1 and F2 are both location of the second training symbol for respective blocks.

Figure 3:
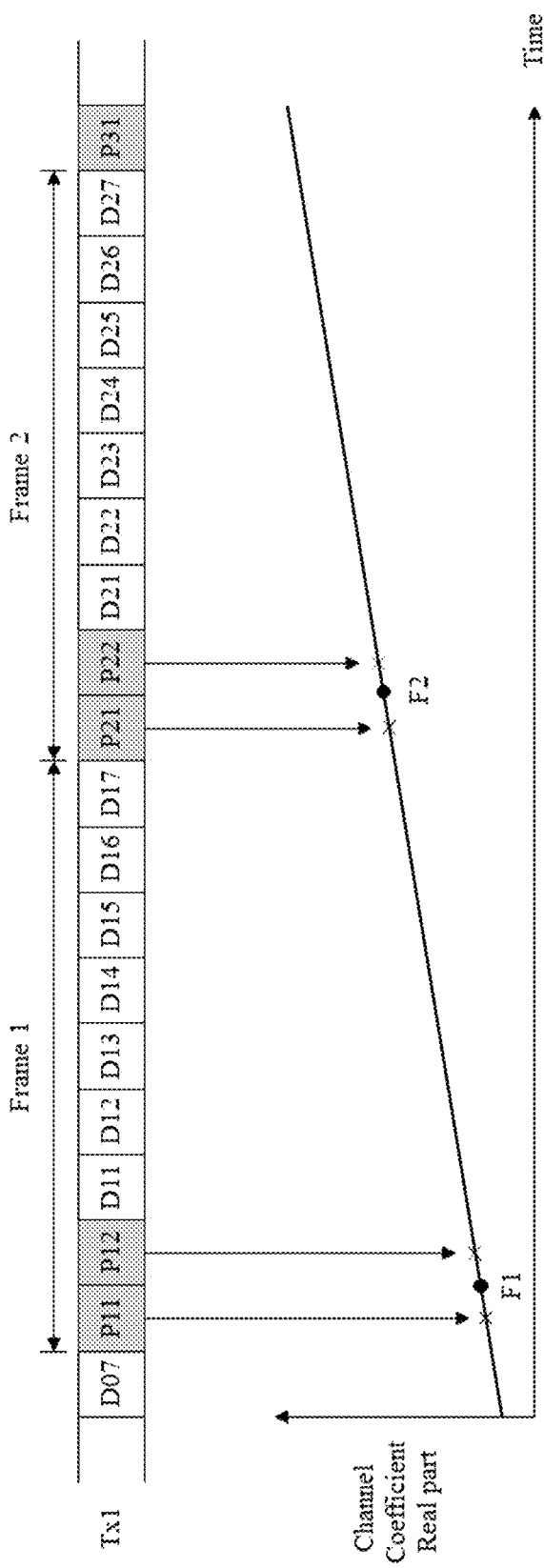
FIG. 3 is a schematic illustrating a second channel estimation stage.

FIG. 3 shows the second channel estimation stage. By using the estimated first channel coefficients at F1 and F2, the second channel coefficients at symbol times P11, P12, P21, and P22 are estimated by interpolating and/or extrapolating the channel coefficients estimated for F1 and F2. Due to the coherence of the channel in time, the interpolation/extrapolation step can take advantage of the availability of estimated channel coefficients at multiple points in time so that the accuracy of the estimation of the channel corresponding to each of the channel training symbols may be improved.

The process can then be repeated. In particular, the estimated second channel coefficients at P11, P12, P21 and P22 can be utilised to re-estimate the first channel coefficients at time F1 and F2. Then, the second channel coefficients at P11, P12, P21 and P22 can be re-estimated taking into account the re-estimated first channel coefficients at F1 and F2. The process can be repeated iteratively to improve the accuracy of the channel estimation.

The method can be performed utilising a matrix that can be invertible in the time domain and/or the frequency domain as will be explained mathematically below. In particular, the received symbols at a receiver is given as:

$$y(i_Z) = \sum_{i_T=1}^{N_T} h(i_T, i_Z) \times (i_T, i_Z) + n(i_Z)$$

where $i_Z=1, 2, \ldots, N_Z$ and
- $y(i_Z)$ is the received symbol at the $i_Z$th symbol time,
- $h(i_T, i_Z)$ is the single tap channel coefficient between the $i_T$th transmitter and the receiver at the $i_Z$th symbol time,
- $x(i_T, i_Z)$ is the channel training symbol for the $i_T$th transmitter at the $i_Z$th symbol time, and
- $n(i_Z)$ is the noise at the receiver at the $i_Z$th symbol time.

The number of channel training symbols per a block is $N_Z$.

Separating each of the channel coefficients into a constant portion and a time varying portion provides:

$$y(i_z) = \sum_{i_T=1}^{N_T} g(i_T) f(i_T, i_Z) \times (i_T, i_Z) + n(i_Z) \tag{1}$$

where $$h(i_T,i_Z)=g(i_T)f(i_T,i_Z) \tag{2}$$

and
- g(i) is the constant term of the single tap channel coefficient between the $i_T$th transmitter and the receiver over the duration of a block of channel training symbols, and
- $f(i_T, i_Z)$ is the time varying part of the single tap channel coefficient between the $i_T$th transmitter and the receiver at the $i_Z$th symbol time.

The channel estimation may be performed in time domain or in frequency domain.

For time domain channel estimation, the above equation can be written in a matrix form as the following:

$$\begin{bmatrix} y(1) \\ \vdots \\ y(N_Z) \end{bmatrix} = \begin{bmatrix} w(1,1) & \ldots & w(N_T,1) \\ \vdots & \ddots & \vdots \\ w(1,N_Z) & \ldots & w(N_T,N_Z) \end{bmatrix} \begin{bmatrix} g(1) \\ \vdots \\ g(N_T) \end{bmatrix} + \begin{bmatrix} n(1) \\ \vdots \\ n(N_Z) \end{bmatrix} \tag{3}$$

where $i_Z=1, 2, \ldots, N_Z$ and $w(i_T, i_Z)=f(i_T, i_Z)x(i_T, i_Z)$.

As discussed above, the initial estimate of $f(i_T, i_Z)$ (herein $\tilde{f}(i_T, i_Z, 1)$) is assumed to be constant and is equal to:

$$\tilde{f}(i_T,i_Z,1)=1 \tag{4}$$

Then the initial estimate of $w(i_T, i_Z)$ (herein $\tilde{w}(i_T, i_Z, 1)$) is defined as:

$$\tilde{w}(i_T,i_Z,1)=\tilde{f}(i_T,i_Z,1)x(i_T,i_Z)=x(i_T,i_Z) \tag{5}$$

Then the initial estimate of $g(i_T)$ (herein $\tilde{g}(i_T, 1)$) can be obtained by:

$$\begin{bmatrix} \tilde{g}(1,1) \\ \vdots \\ \tilde{g}(N_T,1) \end{bmatrix} = \begin{bmatrix} \tilde{w}(1,1,1) & \ldots & \tilde{w}(N_T,1,1) \\ \vdots & \ddots & \vdots \\ \tilde{w}(1,N_Z,1) & \ldots & \tilde{w}(N_T,N_Z,1) \end{bmatrix}^{-1} \begin{bmatrix} y(1) \\ \vdots \\ y(N_Z) \end{bmatrix} = \begin{bmatrix} x(1,1) & \ldots & x(N_T,1) \\ \vdots & \ddots & \vdots \\ x(1,N_Z) & \ldots & x(N_T,N_Z) \end{bmatrix}^{-1} \begin{bmatrix} y(1) \\ \vdots \\ y(N_Z) \end{bmatrix} \tag{6}$$

The initial estimate of $h(i_T, i_Y)$ (herein $\tilde{h}(i_T, i_Y, 1)$), where $i_Y$ represents the representative time (e.g. in the middle of the block of the channel training symbols) for the corresponding channel training symbol period, is defined as:

$$\tilde{h}(i_T,i_Y,1)=\tilde{g}(i_T,1) \tag{7}$$

The initial estimation of $\tilde{h}(i_T, i_Z, 1)$, is obtained by interpolating or extrapolating $\tilde{h}(i_T, i_Y, 1)$ obtained at two or more frames.

As the constant part of the channel is assumed to be equal to 1, the re-estimate of the time varying part of the single tap channel coefficients (i.e. $\tilde{f}(i_T, i_Z, 2)$) is:

$$\tilde{f}(i_T,i_Z,2)=\tilde{h}(i_T,i_Z,1) \tag{8}$$

The updated second estimate of $w(i_T, i_Z)$ (i.e. $\tilde{w}(i_T, i_Z, 2)$) is defined as:

$$\tilde{w}(i_T,i_Z,2)=\tilde{f}(i_T,i_Z,2)x(i_T,i_Z) \tag{9}$$

The update of the estimation of $g(i_T)$ can be further performed by:

$$\begin{bmatrix} \tilde{g}(1,2) \\ \vdots \\ \tilde{g}(N_T,2) \end{bmatrix} = \begin{bmatrix} \tilde{w}(1,1,2) & \ldots & \tilde{w}(N_T,1,2) \\ \vdots & \ddots & \vdots \\ \tilde{w}(1,N_Z,2) & \ldots & \tilde{w}(N_T,N_Z,2) \end{bmatrix}^{-1} \begin{bmatrix} y(1) \\ \vdots \\ y(N_Z) \end{bmatrix} \tag{10}$$

The process can be performed iteratively until the results converge, or until a specified number of iteration is reached.

The process can be also performed in frequency domain. In particular, the Fourier transform of the received symbols can be given by $$Y(i_F) = \sum_{i_Z=1}^{N_Z} y(i_Z) e^{-\frac{j2\pi(i_Z-1)(i_F-1)}{N_Z}} = \sum_{i_T=1}^{N_T} g(i_T) W(i_T, i_F) + N(i_F) \quad (11)$$

where $i_F = 1, 2, \ldots, N_F$ and
$Y(i_F)$ is the Fourier transform of $y(i_Z)$,
$W(i_T, i_F)$ is the Fourier transform off $(i_T, i_Z) x(i_T, i_Z)$, and
$N(i_F)$ is the Fourier transform of $n(i_Z)$.
The above equation can be written in a matrix form as the following:

$$\begin{bmatrix} Y(1) \\ \vdots \\ Y(N_F) \end{bmatrix} = \begin{bmatrix} W(1,1) & \cdots & W(N_T,1) \\ \vdots & \ddots & \vdots \\ W(1,N_F) & \cdots & W(N_T,N_F) \end{bmatrix} \begin{bmatrix} g(1) \\ \vdots \\ g(N_T) \end{bmatrix} + \begin{bmatrix} N(1) \\ \vdots \\ N(N_F) \end{bmatrix} \quad (12)$$

Again, the initial estimate of $f(i_T, i_Z)$ (i.e. $\tilde{f}(i_T, i_Z, 1)$) is:

$$\tilde{f}(i_T, i_Z, 1) = 1 \quad (13)$$

Then the initial estimate of $W(i_T, i_F)$ (herein $\tilde{W}(i_T, i_F, 1)$) is given as the Fourier transform of:

$$\tilde{w}(i_T, i_Z, 1) = \tilde{f}(i_T, i_Z, 1) x(i_T, i_Z) = x(i_T, i_Z) \quad (14)$$

Then the initial estimate of $g(i_T)$, $\tilde{g}(i_T, 1)$, can be obtained by:

$$\begin{bmatrix} \tilde{g}(1,1) \\ \vdots \\ \tilde{g}(N_T,1) \end{bmatrix} = \begin{bmatrix} \tilde{W}(1,1,1) & \cdots & \tilde{W}(N_T,1,1) \\ \vdots & \ddots & \vdots \\ \tilde{W}(1,N_F,1) & \cdots & \tilde{W}(N_T,N_F,1) \end{bmatrix}^{-1} \begin{bmatrix} Y(1) \\ \vdots \\ Y(N_F) \end{bmatrix} = \begin{bmatrix} X(1,1) & \cdots & X(N_T,1) \\ \vdots & \ddots & \vdots \\ X(1,N_F) & \cdots & X(N_T,N_F) \end{bmatrix}^{-1} \begin{bmatrix} Y(1) \\ \vdots \\ Y(N_F) \end{bmatrix} \quad (15)$$

A similar process to that which occurred in the time domain follows to obtain the next updated estimate of $g(i_T)$, namely $\tilde{g}(i_T, 2)$. The process can be performed iteratively until the results converge, or until a specified number of iterations have been performed.

Simulation

A set of computer simulations were performed to demonstrate the effectiveness of the channel estimation method for a multi-transmitter time varying channel.

As an example, the simulation was configured to use four transmitters and eight receivers to perform a 4×8 MIMO wireless transmission in a single carrier. The simulation was performed on the baseband. Independent and identically distributed (i.i.d.) Rayleigh frequency flat time varying fading channel model with the maximum Doppler frequency of 200 Hz was used as an example.

Three channel estimation methods were compared:
LTE-Advanced like time division multi-transmitter method denoted as TDMT channel estimation.
IEEE 802.11ac like code division multi-transmitter channel estimation method denoted as CDMT channel estimation.
Channel estimation using the current invention, denoted as iterative multi-transmitter (IMT) channel estimation.

The channel training symbols for the above three methods are as follows:

TDMT:
[1 0 0 0] for transmitter 1,
[0 1 0 0] for transmitter 2,
[0 0 1 0] for transmitter 3, and
[0 0 0 1] for transmitter 4.

CDMT:
[1 −1 1 1] for transmitter 1,
[1 1 −1 1] for transmitter 2,
[1 1 1 −1] for transmitter 3, and
[−1 1 1 1] for transmitter 4.

IMT: as shown in Table 1.

TABLE 1

Example IMT channel training symbols for four transmitters.

| | Symbol 1 | | Symbol 2 | | Symbol 3 | | Symbol 4 | |
|---|---|---|---|---|---|---|---|---|
| | Real | Imag | Real | Imag | Real | Imag | Real | Imag |
| Transmitter 1 | −0.2555 | 0.6382 | −0.1588 | 0.4206 | 1.4437 | 0.1427 | 1.0909 | 0.3107 |
| Transmitter 2 | 0.1879 | 0.5890 | −0.2478 | −0.6372 | −0.9254 | 0.6894 | 1.2218 | −0.6259 |
| Transmitter 3 | 0.8532 | 0.6171 | 1.5072 | 0.2400 | 0.0315 | 0.7085 | −0.2419 | 0.2573 |
| Transmitter 4 | −1.4181 | 0.3022 | 0.7898 | −0.6657 | 0.3256 | 0.1435 | −0.3590 | −0.8007 |

The simulation process 400 is depicted in the block diagram shown in FIG. 4. In particular, an information bit generator module 410 for each of the four transmitters, Tx1 to Tx4, generates random binary information bits. A set of eight consecutive information bits from the output of the information bit generator module 410 is converted into one of 256 quadrature amplitude modulation (QAM) data symbols by a 256QAM mapper module 420. A set of twelve consecutive 256QAM data symbols are pre-fixed with four channel training symbols, generated by a channel training symbol generator 440, by a frame assembler module 430. The output of the frame assembler module 430 is fed into the baseband channel simulator module 450.

As an example, a symbol duration of 72 μs was chosen, which is similar to LTE-Advanced symbol duration. With sixteen symbols per frame, the duration of a frame is 1152 μs in this example. The ratio of the number of channel training symbols to the number of data symbols in each frame is determined so that the channel coefficients can be estimated frequently enough to capture the temporal variation of the radio propagation channel. As a rule of thumb, the maximum Doppler frequency of 200 Hz requires the estimation of the channel at the rate corresponding to 400 Hz, which corresponds to the frame size of 1/400=2.5 ms. The chosen frame duration of 1152 μs is expected to capture the temporal variation of the channel well.

As previously mentioned, the channel simulator is configured to simulate four transmitter—eight receiver MIMO i.i.d. Rayleigh frequency flat time varying channel with the maximum Doppler frequency of 200 Hz. This maximum Doppler frequency corresponds to a movement of the transmitters Tx1-Tx4 at approximately 108 km/h at a carrier frequency of 2 GHz.

At each of the eight receivers, the received stream of symbols are de-assembled by a frame de-assembler module 460 to extract the received symbols corresponding to the channel training symbols and data symbols. The channel training symbol part of the received symbols are sent to the channel estimation module 470 to estimate the channel at every data symbol time.

For each channel estimation method, the same low pass filter based interpolation was used to derive channel coefficients at each data symbol and in the case of IMT, the channel coefficients at the channel training symbols. The low pass filter was designed so that The variation of the channel will not be blocked;
Noise or channel estimation error components may be blocked; and
The low pass filter amplitude decreases smoothly to zero at the two edges.

Figure 5:
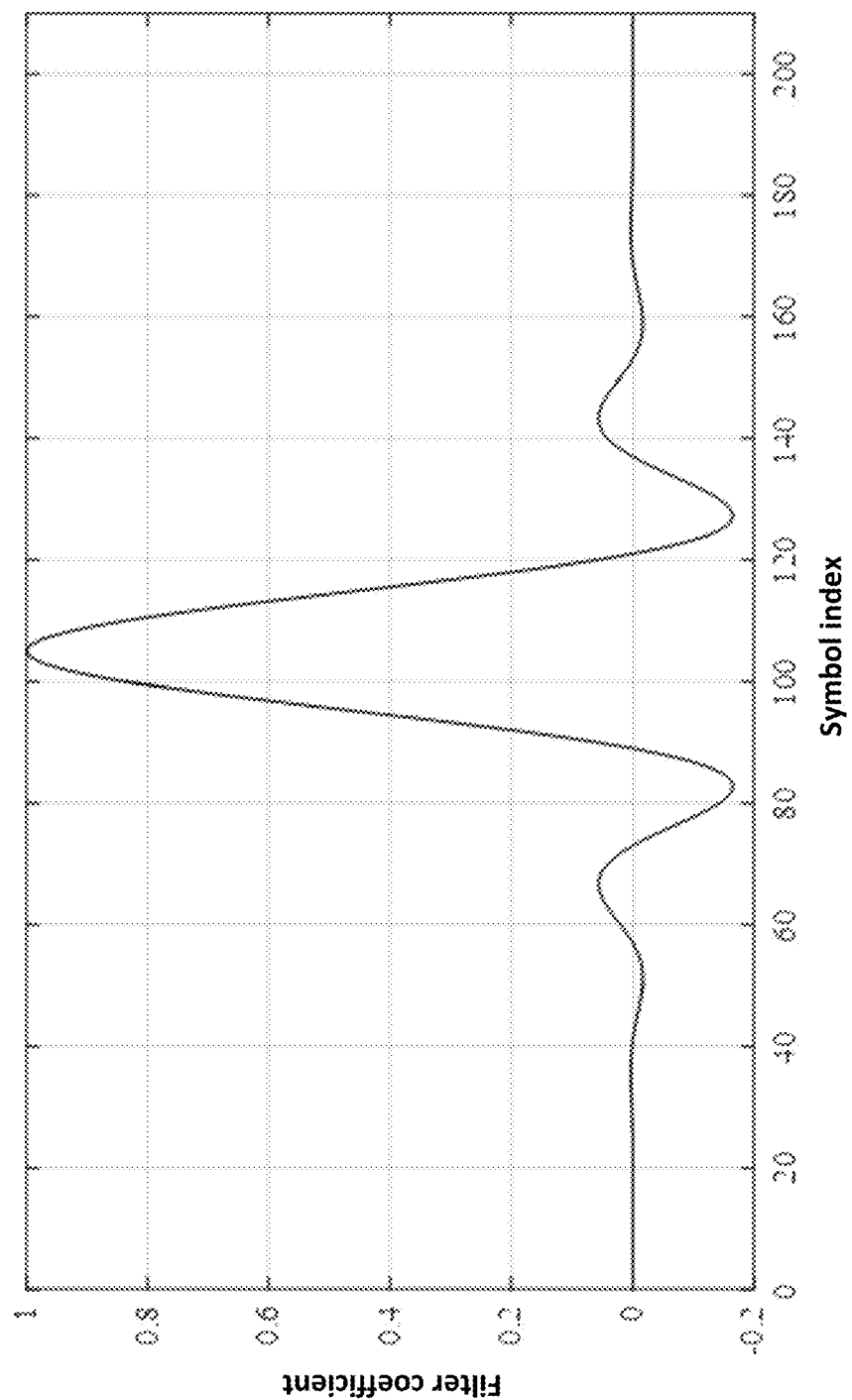
FIG. 5 is an example low pass filter used for interpolation in the second channel estimation stage for the simulation.

For this example, the low pass filter, p(n), was defined as follows:

$$p(n) = \frac{\sin(\pi a)}{\pi a} B_{209}$$

where $$a = \frac{n}{16} - 6.5625$$

and n=1, ..., 209. $B_{209}$ is a 209-point symmetric 4-term Blackman-Harris window. FIG. 5 shows a plot of the low pass filter coefficients.

The output of the channel estimation module 470 and the received symbols corresponding to the data symbol time are sent to zero-forcing (ZF) equaliser 480 to perform MIMO zero-forcing to produce estimated transmitted data symbols. The output of the ZF equaliser 480 is fed into a 256QAM de-mapper module 490 to convert each of the estimated 256QAM data symbols to corresponding binary bits. The original transmitted information bits are compared with the estimated information bits to determine the bit error probability at an information bit sink module 495. The absolute difference of the transmitted 256QAM data symbols and estimated 256QAM data symbols is known as the error vector magnitude (EVM).

Figure 6:
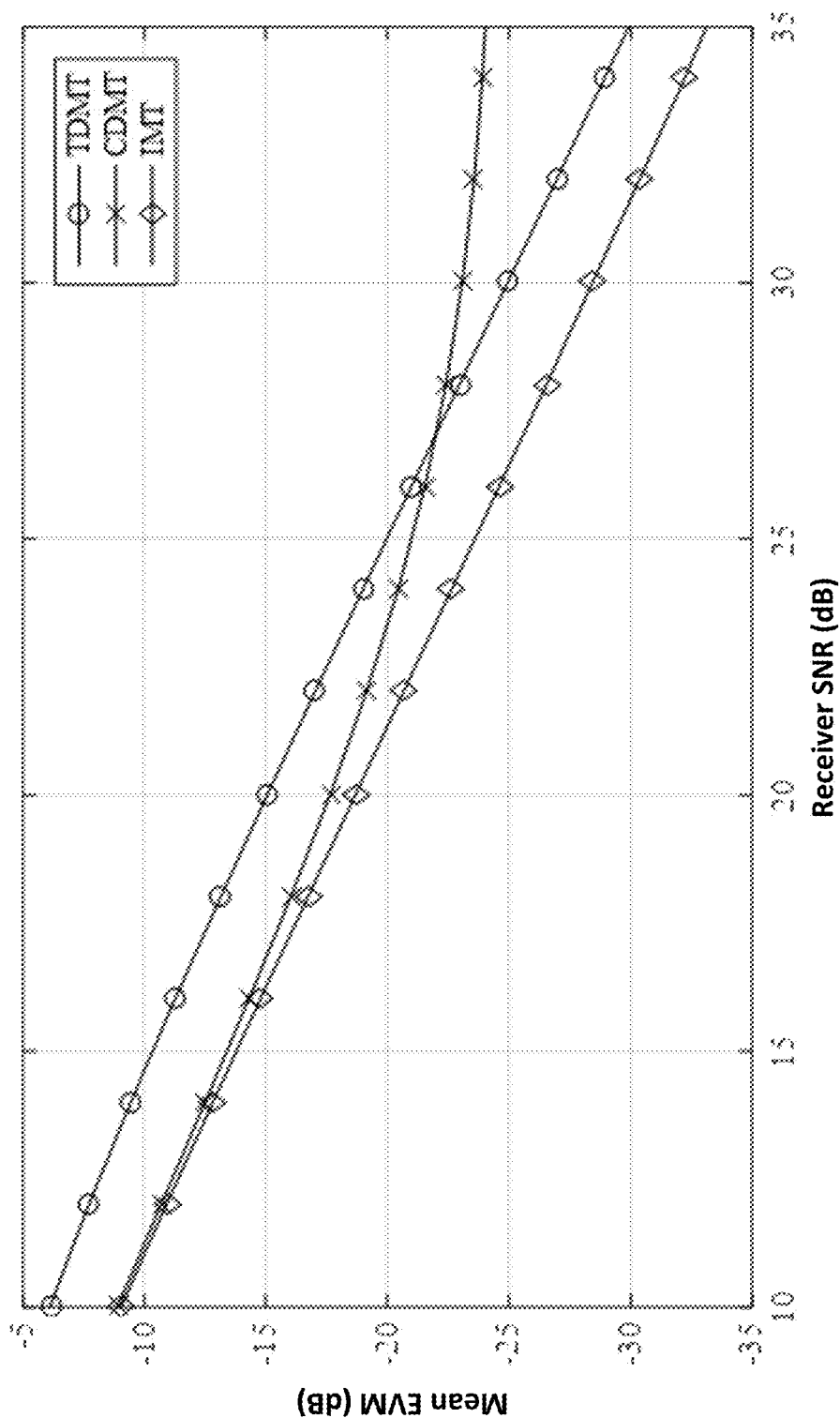
FIG. 6 is a plot of simulation results of mean error vector magnitude versus receiver SNR for TDMA channel estimation, CDMA channel estimation, and the multi-transmitter channel estimation of the current invention for the simulation of FIG. 4.

FIGS. 6 and 7 show the simulation results in terms of mean EVM and bit error probability, respectively, as a function of receiver signal to noise ratio (SNR). When the effects of receiver noise are larger than the variation of the channel during the four channel training symbol time (say the receiver SNR range from 10 dB to 15 dB), both the CDMT and IMT outperforming the TDMT method. This is due to CDMT and IMT using four channel training symbols to reduce the effects of receiver noise (i.e. processing gain) compared to TDMT which uses only one channel training symbol per transmitter. While the performance of TDMT may be improved by allowing a higher power during the transmission of the channel training symbols, such method would incur extra constraints in such a component as a power amplifier and may not be practical.

As the receiver SNR increases, the effects of channel time variation surpasses the effects of receiver noise and CDMT cannot take advantage of the higher receiver SNR and performance saturation is observed. The performance of both TDMT and IMT improves as the receiver SNR improves, with IMT outperforming TDMT by approximately 4 dB. Higher performance improvements are expected in relation to IMT when a larger number of transmitters are involved due to a larger number of channel training symbols per frame being required.

The above-described method is applicable to a system with multiple transmitters co-located or distributed, or a set of transmitters with a single local oscillator or multiple local oscillators.

Referring to FIG. 9 there is shown a system diagram of a system 900 utilising the multi-transmitter channel estimation method discussed above. In particular the system 900 includes a plurality of trasmitters (Tx1 ... TxN, collectively referred to as 910) and a plurality of receivers (Rx1 ... RxN, collectively referred to as 920). Each transmitter Tx transmits in the same frequency as the remaining transmitters. The system 900 can include a multi-transmitter device 905 including the plurality of transmitters 910 and a multi-receiver device 915 which includes the plurality of receivers 920. Each receiver Rx is configured to perform the method as described above. In particular, each receiver Rx can be configured to: (a) wirelessly receive at least two frames, each frame including a block of training symbols received at different points in time for a time-varying channel; (b) estimate, for each block at a block location, a first channel coefficient of the time-varying channel, wherein the block location is the same for each block; and (c) interpolate or extrapolate a plurality of second channel coefficients for the respective training symbols of each block based on the respective first channel coefficient.

In one particular embodiment, each receiver Rx may be a USRP (Universal Software Radio Peripheral) device available from National Instruments.

It will be appreciated that as the method may be implemented by a software defined radio device, computer executable instructions may be stored in memory of the software defined radio device. In particular, the software defined radio device can include a non-transitory computer readable medium including executable instructions which, when executed by a processor of the software defined radio device, configure the software defined radio device to: (a) wirelessly receive at least two frames, each frame including a block of training symbols received at different points in time for a time-varying channel; (b) estimate, for each block at a block location, a first channel coefficient of the time-varying channel, wherein the block location is the same for each block; and (c) interpolate or extrapolate a plurality of second channel coefficients for the respective training symbols of each block based on the respective first channel coefficient. In certain embodiments, the software defined radio device is further configured by execution of the executable instructions to: (d) re-estimate the first channel coefficient for each block based on the plurality of second channel coefficients for each block; and (e) re-estimate the plurality of second channel coefficients for each block by interpolation or extrapolation using the respective first channel coefficient. Furthermore, the software defined radio device is further configured by execution of the executable instructions to: (f) iteratively perform steps (d) and (e) until the respective plurality of second channel coefficients for each block have converged, or until a specified number of iterations are reached. In certain embodiments, a first channel coefficient for each block is estimated in step (b) as being constant throughout the reception of the respective block. In certain embodiments, the software defined radio device performs the method in a time domain or a frequency domain.

FIGS. 8a and 8b collectively form a schematic block diagram of a general purpose electronic device 801 including embedded components, in which a channel estimation processing module may be implemented. The channel estimation processing module may alternatively be implemented in dedicated hardware such as one or more integrated circuits performing the functions or sub functions of the channel estimation processing module. Such dedicated hardware may include graphic processors, digital signal processors, or one or more microprocessors and associated memories.

As seen in FIG. 8a, the electronic device 801 comprises an embedded controller 802. Accordingly, the electronic device 801 may be referred to as an "embedded device." In the present example, the controller 802 has a processing unit (or processor) 805 which is bi-directionally coupled to an internal storage module 809. The storage module 809 may be formed from non-volatile semiconductor read only memory (ROM) 860 and semiconductor random access memory (RAM) 870, as seen in FIG. 8b. The RAM 870 may be volatile, non-volatile or a combination of volatile and non-volatile memory.

As seen in FIG. 8a, the electronic device 801 also comprises a portable memory interface 806, which is coupled to the processor 805 via a connection 819. The portable memory interface 806 allows a complementary portable memory device 825 to be coupled to the electronic device 801 to act as a source or destination of data or to supplement the internal storage module 809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 801 also has a communications interface 808 to permit coupling of the electronic device 801 to a computer or communications network 820 via a connection 821. The connection 821 may be wired or wireless. For example, the connection 821 may be radio frequency or optical. An example of a wired connection includes Ethernet. Further, an example of wireless connection includes Bluetooth type local interconnection, Wi-Fi (including protocols based on the standards of the IEEE 802.11 family), Infrared Data Association (IrDa) and the like.

The method of FIGS. 1A and 1B may be implemented as one or more software application programs 833 executable within the embedded controller 802. In particular, with reference to FIG. 8b, the steps of the described method are effected by instructions in the software 833 that are carried out within the embedded controller 802. The software instructions may be formed as one or more code modules, each for performing one or more particular tasks.

The software 833 of the embedded controller 802 is typically stored in the non-volatile ROM 860 of the internal storage module 809. The software 833 stored in the ROM 860 can be updated when required from a computer readable medium. The software 833 can be loaded into and executed by the processor 805. In some instances, the processor 805 may execute software instructions that are located in RAM 870. Software instructions may be loaded into the RAM 870 by the processor 805 initiating a copy of one or more code modules from ROM 860 into RAM 870. Alternatively, the software instructions of one or more code modules may be pre-installed in a non-volatile region of RAM 870 by a manufacturer. After one or more code modules have been located in RAM 870, the processor 805 may execute software instructions of the one or more code modules.

The application program 833 is typically pre-installed and stored in the ROM 860 by a manufacturer, prior to distribution of the electronic device 801. However, in some instances, the application programs 833 may be supplied to the user encoded on one or more computer readable storage media 825 and read via the portable memory interface 806 of FIG. 8a prior to storage in the internal storage module 809. In another alternative, the software application program 833 may be read by the processor 805 from the network 820. Computer readable storage media refers to any non-transitory, tangible storage medium that participates in providing instructions and/or data to the embedded controller 802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the electronic device 801. Examples of computer readable transmission media that may also participate in the provision of software, application programs, instructions and/or data to the electronic device 801 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 8b illustrates in detail the embedded controller 802 having the processor 805 for executing the application programs 833 and the internal storage 809. The internal storage 809 comprises read only memory (ROM) 860 and random access memory (RAM) 870. The processor 805 is able to execute the application programs 833 stored in one or both of the connected memories 860 and 870. When the electronic device 801 is initially powered up, a system program resident in the ROM 860 is executed. The application program 833 permanently stored in the ROM 860 is sometimes referred to as "firmware". Execution of the firmware by the processor 805 may fulfil various functions, including processor management, memory management, device management, storage management and user interface.

The processor 805 typically includes a number of functional modules including a control unit (CU) 851, an arithmetic logic unit (ALU) 852 and a local or internal memory comprising a set of registers 854 which typically contain atomic data elements 856, 857, along with internal buffer or cache memory 855. One or more internal buses 859 interconnect these functional modules. The processor 805 typically also has one or more interfaces 858 for communicating with external devices via system bus 881, using a connection 861.

The application program 833 includes a sequence of instructions 862 though 863 that may include conditional branch and loop instructions. The program 833 may also include data, which is used in execution of the program 833. This data may be stored as part of the instruction or in a separate location 864 within the ROM 860 or RAM 870.

In general, the processor 805 is given a set of instructions, which are executed therein. This set of instructions may be organised into blocks, which perform specific tasks or handle specific events that occur in the electronic device 801. Typically, the application program 833 waits for events and subsequently executes the block of code associated with that event. Events may be triggered in response to input from a user, via the user input devices 813 of FIG. 8*a*, as detected by the processor 805. Events may also be triggered in response to other sensors and interfaces in the electronic device 801.

The execution of a set of the instructions may require numeric variables to be read and modified. Such numeric variables are stored in the RAM 870. The disclosed method uses input variables 871 that are stored in known locations 872, 873 in the memory 870. The input variables 871 are processed to produce output variables 877 that are stored in known locations 878, 879 in the memory 870. Intermediate variables 874 may be stored in additional memory locations in locations 875, 876 of the memory 870. Alternatively, some intermediate variables may only exist in the registers 854 of the processor 805.

The execution of a sequence of instructions is achieved in the processor 805 by repeated application of a fetch-execute cycle. The control unit 851 of the processor 805 maintains a register called the program counter, which contains the address in ROM 860 or RAM 870 of the next instruction to be executed. At the start of the fetch execute cycle, the contents of the memory address indexed by the program counter is loaded into the control unit 851. The instruction thus loaded controls the subsequent operation of the processor 805, causing for example, data to be loaded from ROM memory 860 into processor registers 854, the contents of a register to be arithmetically combined with the contents of another register the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the method of FIGS. 1*a* and 1*b* is associated with one or more segments of the application program 833, and is performed by repeated execution of a fetch-execute cycle in the processor 805 or similar programmatic operation of other independent processor blocks in the electronic device 801.

The arrangements described are applicable to the wireless communication industries.

In one form, the time-varying channel can be a narrowband communication channel of a mobile environment. For example, the narrowband communication channel can have a carrier frequency of 1 GHz or less. In another form, the narrowband communication channel can have a bandwidth of 25 KHz or less. In another example, the narrowband communication channel can have a carrier frequency of 1 GHz or less and a bandwidth of 25 KHz or less.

Alternatively, the time-varying channel can be a narrowband communication channel of a mobile environment with other characteristics. For example, the time-varying channel can be a narrowband communication channel of a mobile environment having a carrier frequency greater than 1 GHz. In another form, the time-varying channel can be a narrowband communication channel of a mobile environment having a bandwidth of more than 25 KHz. In another form, the time-varying channel can be a narrowband communication channel of a mobile environment having a carrier frequency greater than 1 GHz and a bandwidth of more than 25 KHz.

In a further alternative, the time-varying channel can be a wideband communication channel of a mobile environment.

Many modifications will be apparent to those skilled in the art without departing from the scope of the present invention.

The claims of the present invention are as follows:

1. A method of performing multi-transmitter channel estimation for a time-varying channel, wherein the method includes:
    (a) wirelessly receiving at least two frames, each frame including a block of training symbols received at different points in time for a time-varying channel;
    (b) estimating, for each block at a block location, a first channel coefficient of the time-varying channel, wherein the block location is the same for each block;
    (c) interpolating or extrapolating a plurality of second channel coefficients for the respective training symbols of each block based on the respective first channel coefficient;
    (d) re-estimating the first channel coefficient for each block based on the plurality of second channel coefficients for each block; and
    (e) re-estimating the plurality of second channel coefficients for each block by interpolation or extrapolation using the respective first channel coefficient.

2. The method according to claim 1, wherein the method further includes
    (f) iteratively performing steps (d) and (e) until the respective plurality of second channel coefficients for each block have converged, or until a specified number of iterations is reached.

3. The method according to claim 1, wherein a first channel coefficient for each block is estimated in step (b) as being constant throughout reception of the respective block.

4. The method according to claim 1, wherein the method is performed in a time domain.

5. The method according to claim 1, wherein the method is performed in a frequency domain.

6. The method according to claim 1, wherein the time-varying channel is a narrowband communication channel, wherein the narrowband communication channel has at least one of:
    a carrier frequency of more than 1 GHz; and
    a bandwidth of more than 25 KHz.

7. The method according to claim 1, wherein the time-varying channel is a wideband communication channel.

8. A receiver configured to perform multi-transmitter channel estimation for a time-varying channel, wherein the receiver is configured to:
    (a) wirelessly receive at least two frames, each frame including a block of training symbols at different points in time for a time-varying channel;
    (b) estimate, for each block at a block location, a first channel coefficient of the time-varying channel, wherein the block location is the same for each block;
    (c) interpolate or extrapolate a plurality of second channel coefficients for the respective training symbols of each block based on the respective first channel coefficient;
    (d) re-estimate the first channel coefficient for each block based on the plurality of second channel coefficients for each block; and
    (e) re-estimate the plurality of second channel coefficients for each block by interpolation or extrapolation using the respective first channel coefficient.

9. The receiver according to claim 8, wherein the receiver is configured to iteratively re-estimate the first and second channel coefficients for each block until convergence, or until a specified number of iterations is reached.

10. The receiver according to claim 8, wherein the receiver is configured to estimate, for each block, the first channel coefficient as being constant throughout reception of the respective block.

11. The receiver according to claim 8, wherein the receiver is configured to perform the multi-transmitter channel estimation in a time domain.

12. The receiver according to claim 8, wherein the receiver is configured to perform the multi-transmitter channel estimation in a frequency domain.

13. The receiver according to claim 8, wherein the time-varying channel is a narrowband communication channel, wherein the narrowband communication channel has at least one of:
 a carrier frequency of more than 1 GHz; and
 a bandwidth of more than 25 KHz.

14. The receiver according claim 8, wherein the time-varying channel is a wideband communication channel.

* * * * *